US 12,504,233 B2

(12) United States Patent
Maggioli et al.

(10) Patent No.: US 12,504,233 B2
(45) Date of Patent: Dec. 23, 2025

(54) REDUCING GAS INJECTION SYSTEM

(71) Applicant: PAUL WURTH S.A., Luxembourg (LU)

(72) Inventors: Nicolas Maggioli, Thionville (FR); Klaus Peter Kinzel, Sandweiler (LU); Gilles Kass, Sanem (LU)

(73) Assignee: PAUL WURTH S.A., Luxembourg (LU)

( * ) Notice: Subject to any disclaimer, the term of this patent is extended or adjusted under 35 U.S.C. 154(b) by 358 days.

(21) Appl. No.: 18/043,949

(22) PCT Filed: Sep. 27, 2021

(86) PCT No.: PCT/EP2021/076434
§ 371 (c)(1),
(2) Date: Mar. 3, 2023

(87) PCT Pub. No.: WO2022/064022
PCT Pub. Date: Mar. 31, 2022

(65) Prior Publication Data
US 2023/0324122 A1 Oct. 12, 2023

(30) Foreign Application Priority Data
Sep. 28, 2020 (LU) ........................................ 102097

(51) Int. Cl.
*F27D 7/02* (2006.01)
(52) U.S. Cl.
CPC .......... *F27D 7/02* (2013.01); *F27D 2007/023* (2013.01)
(58) Field of Classification Search
CPC ........ F27D 7/02; F27D 2007/023; F27D 3/16; F27D 2003/166; F27D 2003/169; F27B 1/16; C21B 7/163
(Continued)

(56) References Cited

U.S. PATENT DOCUMENTS 3,662,696 A 5/1972 Mahr
3,766,868 A 10/1973 Mahr
(Continued)

FOREIGN PATENT DOCUMENTS

CN 107407523 A 11/2017
CN 108822119 A 11/2018
(Continued)

OTHER PUBLICATIONS

International Search Report for corresponding application PCT/EP2021/076434 filed Sep. 27, 2021; Mail date Dec. 13, 2021.
(Continued)

*Primary Examiner* — Jessee R Roe
*Assistant Examiner* — Michael Aboagye
(74) *Attorney, Agent, or Firm* — CANTOR COLBURN LLP

(57) ABSTRACT

The injector(s) have a nozzle body with an inner gas channel for guiding reducing gas from an inlet port to injection holes(s). The nozzle body is mounted trough an aperture in the blast furnace wall at a shaft level of the blast furnace and includes a peripheral mounting portion configured for connecting the injector in a gas tight manner to the aperture. The inlet port is in fluidic connection with a reducing gas distribution pipe by means of an injector stock including a feeding pipe connected to the reducing gas distribution pipe, an elbow connected to the feeding pipe and an injector pipe connected to the elbow and being flange mounted in a gas tight manner to the inlet port. The injector pipe and/or an outlet of the elbow have at least one cardan compensation joint.

17 Claims, 2 Drawing Sheets

(58) Field of Classification Search
USPC .......... 266/47, 186, 224, 225, 265, 216, 218
See application file for complete search history.

(56) References Cited

U.S. PATENT DOCUMENTS

| | | | | |
|---|---|---|---|---|
| 3,907,703 | A * | 9/1975 | Marion | ..................... C01B 3/50 |
| | | | | 252/373 |
| 3,997,194 | A * | 12/1976 | Eifer | ..................... F16L 51/02 |
| | | | | 285/226 |
| 4,023,832 | A | 5/1977 | Legille | |
| 4,027,605 | A | 6/1977 | Legille | |
| 4,381,938 | A * | 5/1983 | Claflin | ..................... C21B 5/006 |
| | | | | 75/375 |
| 4,987,838 | A | 1/1991 | Mailliet | |
| 5,462,433 | A | 10/1995 | Benck | |
| 9,028,743 | B2 * | 5/2015 | Simoes | ..................... F27D 1/12 |
| | | | | 266/265 |
| 9,605,326 | B2 * | 3/2017 | Martinez-Contreras | ..................... |
| | | | | C21B 7/002 |
| 9,982,946 | B2 * | 5/2018 | Tockert | ..................... C21B 7/24 |
| 10,072,312 | B2 * | 9/2018 | Grant | ..................... C21B 9/14 |

FOREIGN PATENT DOCUMENTS

| | | | | |
|---|---|---|---|---|
| DE | 202012011622 U1 | | 2/2013 | |
| EP | 2848705 | * | 3/2015 | ............ C21B 7/163 |
| EP | 2848705 A1 | | 3/2015 | |
| TW | 201030299 A | | 8/2010 | |

OTHER PUBLICATIONS

Written Opinion for corresponding application PCT/EP2021/076434 filed Sep. 27, 2021; Mail date Dec. 13, 2021.
Examination report issued by the Taiwanese Patent Office in the corresponding Taiwanese patent application No. 110135807; Dated Feb. 20, 2025.

* cited by examiner

REDUCING GAS INJECTION SYSTEM

TECHNICAL FIELD

The present disclosure generally relates to the field of metallurgy and more specifically to the operation of blast furnaces, wherein hot reducing gas is fed into the blast furnace shaft.

BACKGROUND ART

With the Paris Agreement and near-global consensus on the need for action on emissions, it is imperative that each industrial sector looks into the development of solutions towards improving energy efficiency and decreasing $CO_2$ output.

In this context, actors in the field of iron metallurgy have developed new approaches in order to reduce the environmental footprint of the blast furnace iron making route. Indeed, despite alternative methods, like scrap melting or direct reduction within an electric arc furnace, the blast furnace today still represents the most widely used process for steel production.

Amongst the approaches developed to reduce blast furnace $CO_2$ emissions, it has been proposed to introduce hot reducing gas, typically syngas (composed mainly of CO and $H_2$), directly into the shaft of the blast furnace. This is also known as "shaft feeding" and implies the introduction/injection of the hot reducing gas (syngas) through the furnace outer wall, above the hot blast (tuyere) level, i.e. above the bosh, and preferably within the gas solid reduction zone of ferrous oxide above the cohesive zone.

BRIEF SUMMARY

The disclosure proposes a viable reducing gas injection system for feeding hot reducing gas into the shaft of a blast furnace, which can be implemented on existing blast furnaces. The disclosure further provides a compact and cost-effective system for the gas tight connection of the hot syngas piping with the injection points in the shaft of the blast furnace allowing for relative movement of the two systems.

In order to overcome the above-mentioned problem, the present disclosure proposes, in a first aspect, a reducing gas injection system for a blast furnace comprising a blast furnace wall, wherein the reducing gas injection system comprises
a reducing gas distribution pipe,
one or more injectors mounted to (an outer side of) the blast furnace wall at a shaft level,
wherein the reducing gas distribution pipe is (configured for being) attached to the blast furnace wall or its supporting structure;
wherein said one or more injectors comprises a nozzle body with a peripheral wall extending along a longitudinal axis from a front portion, with at least one injection hole, to an opposite rear portion with an inlet port, wherein the nozzle body includes an inner gas channel configured for guiding reducing gas from said inlet port to said injection holes(s);
wherein said nozzle body is mounted through an aperture in said blast furnace wall in such a way that the front portion with the injection hole(s) is located on an inner side of said blast furnace, whereas said rear portion with the inlet port is outside of said blast furnace wall, preferably said mounting is a flange mounting;
wherein said nozzle body comprises a peripheral mounting portion configured for connecting said injector in a gas tight manner to said aperture in said blast furnace wall;
wherein the inlet port is in fluidic connection with the reducing gas distribution pipe by means of an injector stock, said injector stock comprising a feeding pipe connected to the reducing gas distribution pipe, an elbow connected to said feeding pipe and an injector pipe connected to said elbow, said injector pipe being flange mounted in a gas tight manner to the inlet port of the injector and said injector pipe and/or an outlet of the elbow comprising at least one compensation system, which may comprise a cardan joint.

The injection of reducing gas in the shaft of a blast furnace is cited in many publications, but an industrial application has not yet been implemented on a commercial blast furnace.

One challenge in integrating shaft injection in comparison to the known hot blast injection at the tuyere level is the characteristic of the reducing gas. Whereas at the tuyere the gas is simply a hot air, in the case of shaft injection the gas is a reducing gas, typically a synthesis gas (syngas) containing high amounts of highly inflammable hydrogen and CO, the latter even being poisonous to humans.

It is thus of utmost importance to maintain a gas tight connection of the main gas distribution piping with the injection points at the blast furnace. This is all the more true knowing that, because of the high temperatures of the reducing gas (up to about 1100° C.) and the high temperatures prevailing in the inside of a blast furnace at shaft level, the blast furnace wall, the reducing gas distribution pipe, the injector and the injector stock are exposed to thermal expansions and deformations which do cause non-negligible relative displacements and stress to the entire reducing gas injection system. It is therefore necessary for the injector stock to compensate for these relative displacements without the reducing gas being able to escape via leaks.

In the case of tuyeres, the blowpipe front part is pressed with help of a spring-tie rod system to the tuyere incorporated in the wall of the blast furnace. While this provides for some compensation of lateral movement, this solution is however not sufficiently gas tight when using a reducing gas, such as syngas. Hence, contrary to tuyere stock attachment to the tuyere, the injector pipe in the present reducing gas injection system is attached in a gas tight manner to the injector by means of a flange mounting. While this solves the problem of gas-tightness, it takes away the ability of the elbow and injector pipe to compensate for the relative displacements mentioned above.

Cardan compensation joints are known in the art of tuyere stocks and are described among others in U.S. Pat. Nos. 3,662,696, 3,766,868, 4,023,832, 4,027,605, 4,987,838 and 5,462,433, which are hereby incorporated herein by reference. A further advantageous cardan compensation joint is described in DE 20 2012 011 622.3, which is hereby also incorporated herein by reference. The tuyere stocks of the referenced patents offer the advantage of permitting compensation for differential deformations during use and manufacturing inaccuracies between tubular segments of a tuyere stock to be achieved through the use of cardan compensation joints generally in conjunction with bellows-type compensators having a very small number of corrugations.

However, in conventional tuyere stocks, such cardan-type compensation joints are used in the downcomer part of the tuyere stock, i.e. in the part upstream of the elbow, not downstream thereof.

It has been found by the inventors that the loss of the flexibility given by the conventional attachment by spring-tie rod system in tuyere systems, can be advantageously balanced by introducing a cardan-type compensation joint downstream of the elbow's bent, e.g. at an outlet of the elbow (near to the elbow's attachment to the injector pipe) and/or within in the injector pipe as such, without making any compromise on gas tightness.

In order to further compensate as much as possible for any further relative movement between the reducing gas distribution pipe and the injector(s), the feeding pipe preferably also comprises at least one further cardan compensation joint. In advantageous embodiments, two cardan compensation joints, one near the feeding pipe's inlet and one near the feeding pipe's outlet, are foreseen.

Ease of maintenance and time saving during maintenance is very important, especially when having a high number of injection points and thus connections. Quick coupling could be foreseen on the two corresponding flanges of the injector pipe, as well as hooks on the injector pipe for this purpose. In embodiments, the injector pipe is flange mounted in a gas tight manner with bolts or hooks to the inlet port of the injector, the use of hooks allowing for a faster assembling and disassembling. Advantageously, the gas tightness is further improved by using a metallic and/or soft seal between a first mounting flange on said rear portion on said nozzle body and a second mounting flange on said injector pipe. Still more advantageously, all flanges of the injector stock are provided with metallic and/or soft seals. The seal can be of different materials and forms, such as flat, o-ring type or others.

Furthermore, during maintenance, this flange mounting can also be opened for connection of a drill for opening of a blocked injector on the rear flange and which will thus in such cases be constructed to bear the involved forces.

Alternatively, at least for lighter cases of obstruction of the injector or simply for inspection, the elbow preferably comprises a maintenance and inspection port centered with the longitudinal axis of the injector, to which preferably a cover, a view glass and/or a camera is/are removably attached. A camera and a view glass can be used simultaneously, for example by using an appropriately placed beam splitter. As at shaft level, contrary to the tuyere level, the inside of the blast furnace is dark, the camera more preferably is a thermal and/or infrared camera and/or an additional light source can be provided.

In particularly advantageous embodiments, a partial or growing clogging of the injector can also be detected by the integration of a flow detector or preferably a skin flow or a thermocouple in any location of the injector stock, either protruding in the gas flow or being integrated in the refractory lining. Indeed, in case that the gas flow is severely reduced or stopped, the temperature reading of the thermocouple will decrease showing the requirement for inspection and maintenance.

The injector's front region, i.e. comprising the injection hole(s) can be flush with the inner side blast furnace wall, in recess thereof or protruding in the inner side of said blast furnace. In case cooling plates mounted to the inner side of the blast furnace wall, the injector's front region can be flush with the inner side of said cooling plate, in recess thereof or protruding in the inner side of said blast furnace.

In such latter cases, the front portion of the injector is configured to be mounted through a corresponding aperture in a cooling plate attached to an inner side of said blast furnace wall.

It is to be noted that if the injector's front region is protruding into the inner side of the blast furnace, more than one injection hole can be foreseen within the protruding part of the injector, said injection holes being advantageously differently oriented such as straight (along longitudinal axis of the injector), downwards and/or to one or both sides, perpendicularly or at any appropriate angle to the longitudinal axis of the injector.

For protruding injectors, it might be necessary or desirable to provide a protruding cover arranged above the injectors and configured to protect the nozzle body front portion that protrudes inside the blast furnace from a descending burden material.

Furthermore, the front portion of the injector is preferably provided with a cooling system. Alternatively, a separate cooling nose can be mounted around any protruding part of the injector (entirely or in part) inside the blast furnace, which cooling nose would thus not only provide a thermal protection, but also wear protection. The injector and/or the separate cooling nose might thus be cooled with (pressurized) water and will generally be made of materials such as copper, copper alloys, such as copper/nickel alloys, cast iron, cast steel, etc.

While the injector can be made of a plurality of pieces, the injector comprising said nozzle body with said peripheral wall extending along a longitudinal axis from a front portion, with at least one injection hole, is preferably made of one piece. In embodiments, the injector will thus be a single piece, protruding or not in the blast furnace.

Furthermore, the injector(s) may be oriented perpendicularly (pointing to the center of the blast furnace) or tangentially to the blast furnace wall (i.e. at any angle below 90°, preferably at an angle above 10° relative to the blast furnace wall at the location of the injector). The reducing gas injection system may comprise between 15 and 60 injectors, preferably between 20 and 40.

It is also important to note that the distributor pipe does not need to be a closed peripheral collector as generally for the traditional bustle pipe. However this region of the shaft is generally cluttered by coolant piping for the cooling plates and/or supporting structures. Hence, if sufficient space is not available in a given blast furnace environment, the reducing gas distribution pipe can be divided in several portions located around the blast furnace (e.g. 4 quadrants), each portion being supplied by individual reducing gas supply lines from the reducing gas source.

In further embodiments, where the space is limited at shaft level, the reducing gas distribution pipe can be mounted above the hot blast bustle pipe (either attached thereto or preferably to the blast furnace or its supporting structure), but below the level of the injectors. Hence, the feeding pipe of the injector stock is connected to the upper side of the reducing gas distribution pipe and the injector stock is oriented upwards.

In view of the elevated temperatures of the reducing gas, the inner surface of the reducing gas distribution pipe, the injector stock and optionally the injector is/are lined with a refractory insulating material layer in order to protect the reducing gas injection system.

In a second aspect, the present disclosure proposes a blast furnace installation for producing pig iron, comprising a blast furnace and at least one reducing gas injection system as described herein, the injector(s) being mounted at shaft level. A further advantage of the present disclosure is that the reducing gas distribution pipe can be mounted above the level of the injectors or below depending for example of the availability of sufficient space. It is even possible in cases where the reducing gas distribution pipe is divided in several portions located around the blast furnace, to place some of the reducing gas distribution pipe portions above and other below the injector level.

The expression "in fluidic connection" means that two devices are connected by conducts or pipes such that a fluid, e.g. a gas, can flow from one device to another. This expression includes means for changing this flow, e.g. valves or fans for regulating the mass flow, compressors for regulating the pressure, etc., as well as control elements, such as sensors, actuators, etc. necessary or desirable for an appropriate control of the blast furnace operation as a whole or the operation of each of the elements within the blast furnace installation.

The expressions "at [a] shaft level" and "into the shaft of a blast furnace" as used herein imply the injection of a material above the hot blast (tuyere) level, i.e. above the bosh, preferably within the gas solid reduction zone of ferrous oxide above the cohesive zone.

"About" in the present context, means that a given numeric value covers a range of values form −10% to +10% of said numeric value, preferably a range of values form −5% to +5% of said numeric value.

BRIEF DESCRIPTION OF THE DRAWINGS

Preferred embodiments of the disclosure will now be described, by way of example, with reference to the accompanying drawings in which.

Figure 1:
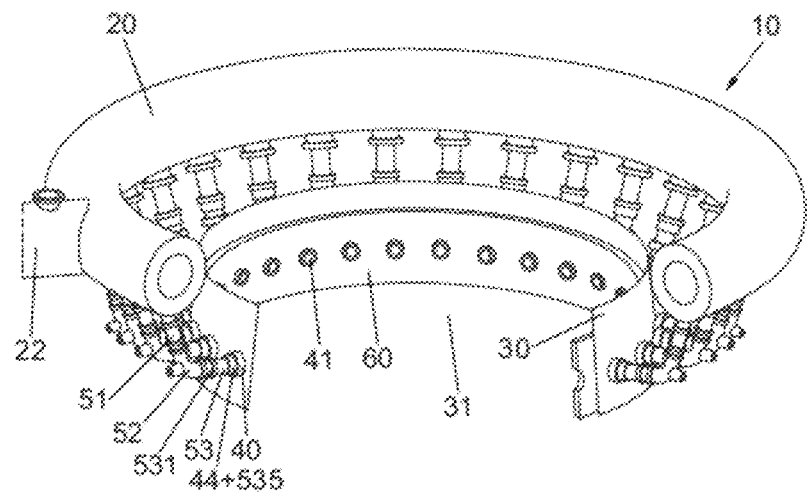
FIG. 1 is a tridimensional schematic view showing an embodiment of a reducing gas injection system mounted to the shaft of a blast furnace.

Further details and advantages of the present disclosure will be apparent from the following detailed description of several not limiting embodiments with reference to the attached drawings.

DETAILED DESCRIPTION

The injection of hot reducing gas in the shaft of a blast furnace is mentioned in many publications, but an industrial application has not yet been implemented on a commercial blast furnace.

One challenge of integrating shaft injection in comparison to the hot blast injection at the tuyere is the characteristic of the gas. Whereas at the tuyere the gas is simply a hot air, in the case of shaft injection the gas is typically a synthesis gas containing high amounts of highly inflammable hydrogen and CO, the latter being poisonous to men.

It is thus of utmost importance to maintain a gas tight connection of the main gas distribution piping with the injection points at the blast furnace.

The injector's outlet may have different designs, ranging from simple openings, tuyere-like openings up to injectors with more than one injection point, preferably oriented in different directions, having e.g. specific exchangeable inserts, protective covers above the injector's outlet, a separate cooled nose, etc.

In the tuyere area the connection between the hot gas piping and specifically between the bustle pipe and the tuyeres, is realized with the tuyere stocks. The tuyere stocks having mainly two tasks:
  being the gas connection between the hot air piping and the tuyeres incorporated in the shell of the blast furnace at tuyere level,
  allowing to compensate the relative movement between the tuyeres incorporated in the blast furnace shell and the hot blast piping connected to the independent steel structure of the blast furnace installation. The relative movement being relatively important due to the fact of different temperatures of the systems.

The conventional tuyere stocks are composed of several parts, the main parts being the downcomer, the elbow and the blow pipe. The blowpipe's half sphere front part is pressed with help of a spring-tie rod system to the tuyere incorporated in the wall of the blast furnace. The elements of the tuyere stock are connected with cardan-type compensation joint(s) in the downcomer allowing movements in two directions. These two-dimensional movements are sufficient to keep the half sphere of the blow pipe in the seat of the tuyere nose. This movable metallic seat connection is sufficient when conducting hot air to the blast furnace.

The conventional tuyeres themselves are also relatively complex systems composed of the tuyere body and the tuyere nose. The latter is protruding in the blast furnace and more specifically in the raceway of the blast furnace. This area is characterized by very high temperature levels, typically 2000 to 2500° C. and by very high gas speeds. Also, molten slag and iron particles can be found at this level of the blast furnace, so it is evident that the nose of the tuyere is subject to damage and must be exchanged on a regular basis.

Normally a high number of tuyeres is employed in a blast furnace, depending on the production of the blast furnace typically 10 to 40.

The inventors identified that in the present reducing gas injection system, the injectors themselves could potentially be simplified compared to the tuyere in the tuyere area based on the following main reasons:
  no thick refractory lining but area of the shaft of the furnace with lower temperature level allowing the cooling with cooling plates and/or cooling boxes and/or external water film cooling,
  typical temperature level of the reducing gas between 900 and 1100° C.,
  lower flow rate, thus reduced diameter of the piping required,
  lower pressure level.

One advantageous effect thereof is that due to the smaller diameter of the injector, there is more space between the injectors easing its connection with a flanged bolted connection including a metallic and/or soft seal to the blast furnace shell. A further advantage of the smaller injector diameter is that this allows keeping the openings in the blast furnace wall and cooling plates small. This in turn ensures an easier retrofitting of this solution on an existing blast furnace without changing the cooling plates.

More particularly relative to the use of a flanged mounting of the injector stock to the injector, gas tightness can further be controlled by applying a fixed torque when tightening the bolts of the flange. Typical measures for verification of gas tightness, such as soap water, can be used.

However, by using a flanged mounting of the injector to the reducing gas distribution pipe, the injector stock must allow compensating for all the relative movements of the injector stock and the reducing gas distribution pipe relative to the injector. Hence the present disclosure proposes the combination of a flanged mounting and a cardan-type compensation joint between the injector and the outlet of the elbow.

Now turning to the drawings, FIG. 1 shows a schematic tridimensional partial cutout view of an embodiment of a reducing gas injection system 10 of the present disclosure for injecting reducing gas, such as syngas, to the shaft of a blast furnace, said system being thus mounted at shaft level to the blast furnace wall 30 or its supporting structure (not shown). The reducing gas injection system's reducing gas distribution pipe 20, here covering the whole circumference of the blast furnace at shaft level, is fed by the reducing gas supply line 22 and is connected to a plurality of injectors 40 with a single injection hole 41 per injector protruding slightly in the inside of the blast furnace 31 through a corresponding aperture in cooling plate(s) 60.

The reducing gas distribution pipe 20 is connected in as gas tight manner to an injector 40 through an injector stock comprising a feeding pipe 51 attached to an elbow 52 and the elbow 52 is attached to the injector pipe 53 which in turn is connected by a flange 535 to a corresponding flange 44 of the injector 40. A cardan compensation joint 531 is provided in this embodiment within the injector pipe 53.

It is to be noted that in FIGS. 1 to 4 the feeding pipe 51 is mounted to the lower side of the reducing gas distribution pipe and oriented downwards, i.e. the injector level is below the reducing gas distribution pipe level. It is however also explicitly provided herewith for "up-side-down" embodiments of a reducing gas injection system wherein the injector level is above the reducing gas distribution pipe level, i.e. the feeding pipe is connected to the upper side of the reducing gas distribution pipe and runs upwards.

Figure 2:
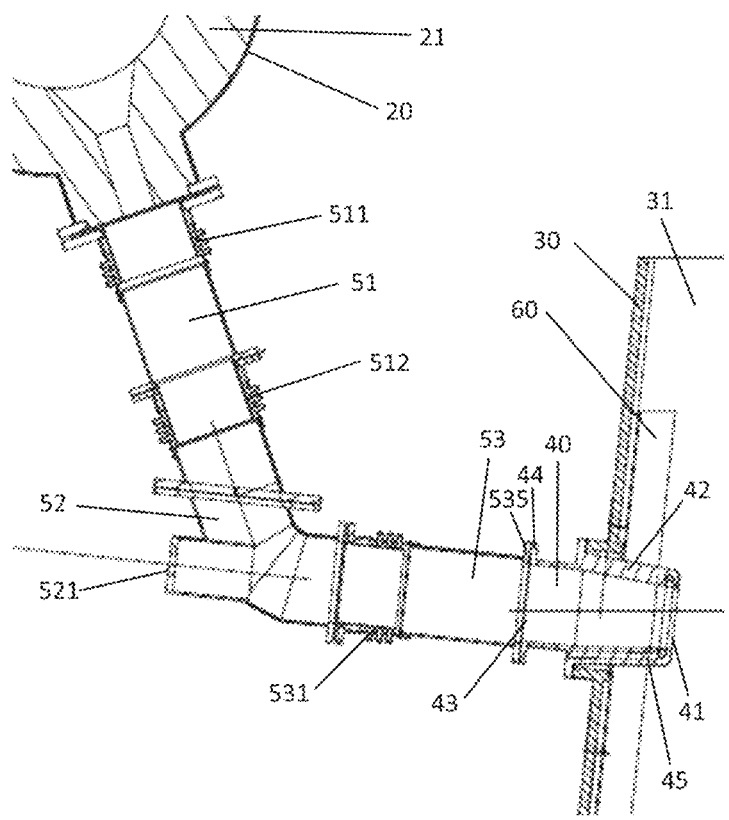
FIG. 2 is a partly sectional view of an embodiment of an injector stock mounted between the reducing gas distribution pipe and the injector.

FIG. 2 shows in more detail another embodiment of the present reducing gas injection system having a reducing gas distribution pipe 20 with its refractory lining 21 connected to an injector stock with its feeding pipe 51, its elbow 52 and its injector pipe, attached to the inlet port 43 of the injector 40. A cardan compensation joint 531 is provided in this embodiment also within the injector pipe 53. It is to be noted that the elements of the injector stock are also preferably provided with a refractory lining, but this lining has been omitted from the drawings for sake of simplicity.

Preferably the feeding pipe 51 is provided with two cardan compensation joints 511, 512, to further compensate for relative movements of the reducing gas distribution pipe to the elbow 52. All the parts of the injector stock are preferably mounted together with corresponding flanges, provided if desired with corresponding seals (not shown).

The injector 40 is attached in a gas tight manner to an aperture in the blast furnace wall 30. In case of the presence of cooling plates 60, these cooling plates 60 are provided with corresponding apertures. Advantageously, the injector 40 or its nozzle body 42 comprises a cooling system 45, such as cooling channels connected to a coolant circulation system, especially if parts surrounding the injection hole(s) 41 protrude within the inner side of the blast furnace 31.

A maintenance and inspection port 521 is provided within the rear part of the elbow, its longitudinal center axis corresponding to the central longitudinal axis of the injector 40.

Figure 3:
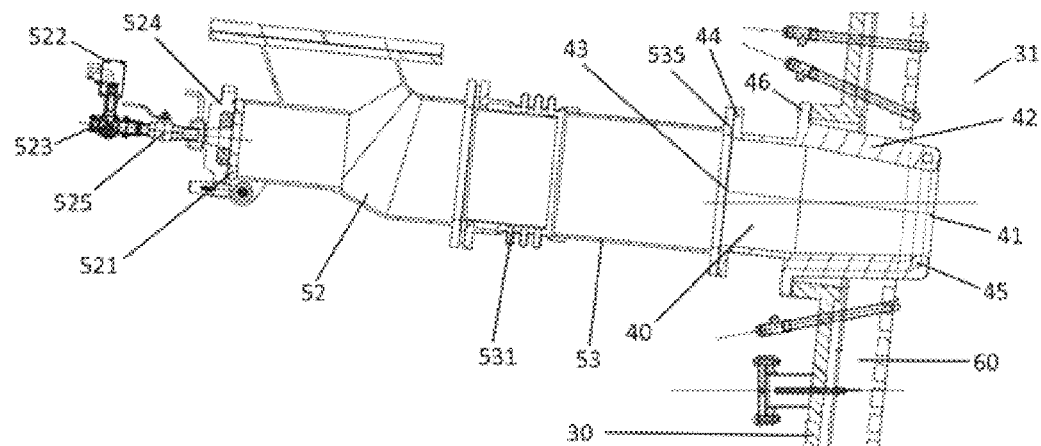
FIG. 3 is a detailed view of another embodiment of part of a reducing gas injection system, showing more particularly a further embodiment of the injector up to the elbow.

FIG. 3 is a detailed view of still another embodiment showing only the parts of the reducing gas injection system downstream of feeding pipe (not shown). The same or equivalent features have the same numerals as mentioned above and in the legend table below.

As shown in more detail in this drawing, the injector is mounted in a gas tight manner with mounting flange 46 to the blast furnace wall 30.

The maintenance and inspection port 521 is provided with a removable cover 524 comprising an aperture in its center, aligned with the central longitudinal axis of the injector 40. To said aperture is mounted a shut-off valve 525 with a combined view glass 523 and camera 522 inspection system.

In this embodiment, the cardan compensation joint 531 is provided within injector pipe 53.

Figure 4:
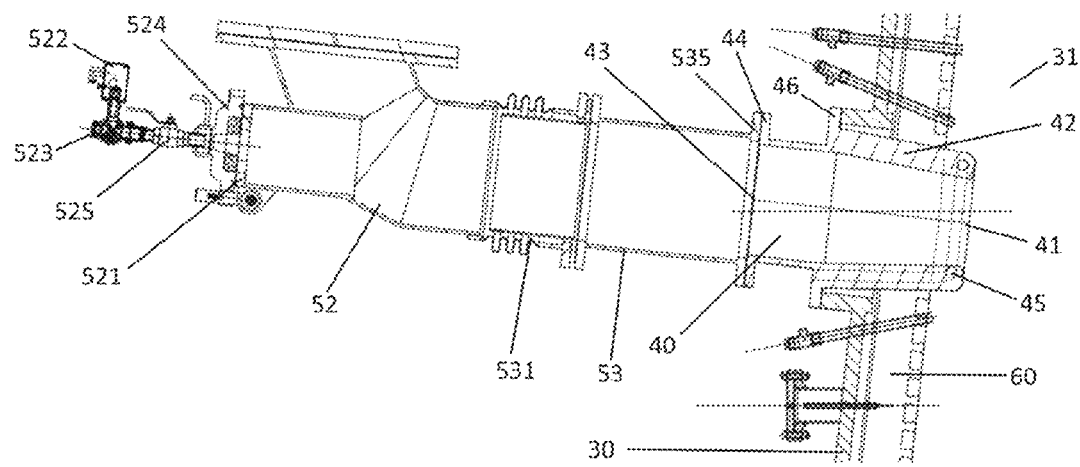
FIG. 4 is a detailed view of still another embodiment of part of a reducing gas injection system, showing more particularly an alternative embodiment of the injector up to the elbow to that of FIG. 3.

FIG. 4 is similar to FIG. 3, except that the cardan compensation joint 531 is provided within the outlet part of the elbow 52.

Figure 5:
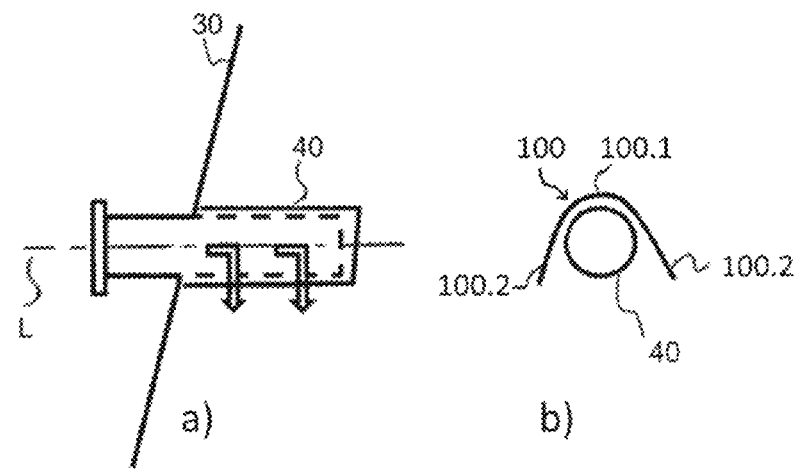
FIG. 5 is a principle diagram of a protective cover for the injector in a) side view and b) front view.

In embodiments, a protruding cover may be arranged above the injector(s) and configured to protect the nozzle body front portion that protrudes inside the furnace from a descending burden material. Such protection of the injector nozzle body against abrasion by the descending burden material (sinter/pellets and coke) can e.g. be achieved by means of a steel shell, smooth or corrugated. The principle of this protruding cover 100 is shown in FIG. 5 and forms a kind of cap extending in the injector's longitudinal direction L. It cover the protruding length of the injector (shown in dashed lines) As can be seen, the cover 100 is a curved steel profile section, more particularly having an inverted, rounded V-shape. The apex 100.1 of the V is above the injector 40 and the two branches 100.2 extends on both lateral sides of the injector 40, optionally even below the injector. The cover 100 can be liquid cooled, directly or indirectly. Coolant channels can e.g. be arranged on the lower side of the shell.

The invention claimed is:

1. A reducing gas injection system for a blast furnace comprising a blast furnace wall, wherein the reducing gas injection system comprises
    a reducing gas distribution pipe,
    one or more injectors mounted to the blast furnace wall at a shaft level,
    wherein the reducing gas distribution pipe is attached to the blast furnace wall or a supporting structure thereof,
    wherein said injector(s) comprise(s) a nozzle body with a peripheral wall extending along a longitudinal axis from a front portion, with at least one injection hole, to an opposite rear portion with an inlet port, wherein the nozzle body includes an inner gas channel for guiding reducing gas from said inlet port to said injection holes(s);
    wherein said nozzle body is mounted through an aperture in said blast furnace wall in such a way that the front portion with the injection hole(s) is located on an inner side of said blast furnace, whereas said rear portion with the inlet port is outside of said blast furnace wall,
    wherein said nozzle body comprises a peripheral mounting portion configured for connecting said injector in a gas tight manner to said aperture in said blast furnace wall,
    wherein the inlet port is in fluidic connection with the reducing gas distribution pipe by means of an injector stock, said injector stock comprising a feeding pipe connected to the reducing gas distribution pipe, an elbow connected to said feeding pipe and an injector pipe connected to said elbow, said injector pipe being flange mounted in a gas tight manner to the inlet port of the injector and said injector pipe and/or an outlet of the elbow comprising at least one cardan compensation joint.

2. The reducing gas injection system as claimed in claim 1, wherein the at least one cardan compensation joint of said injector pipe is connected to the elbow.

3. The reducing gas injection system as claimed in claim 1, wherein the front region of the injection hole(s) is protruding in the inner side of said blast furnace.

4. The reducing gas injection system as claimed in claim 1, wherein the feeding pipe comprises one or more further cardan compensation joints.

5. The reducing gas injection system as claimed in claim 1, wherein the injector is mounted with a flange in a gas tight manner with bolts or hooks to the aperture in said blast furnace wall.

6. The reducing gas injection system as claimed in claim 1, wherein the injector pipe is flange mounted in a gas tight manner with bolts or hooks to the inlet port of the injector, with a metallic and/or soft seal for gas tightness between a first mounting flange on said rear portion on said nozzle body and a second mounting flange on said injector pipe.

7. The reducing gas injection system as claimed in claim 1, wherein the injector(s) comprising said nozzle body with said peripheral wall extending along a longitudinal axis from a front portion, with at least one injection hole is made of one piece.

8. The reducing gas injection system as claimed in claim 1, wherein the elbow comprises a maintenance and inspection port centered with the longitudinal axis of the injector, to which a cover, a view glass and/or a camera is removably attached.

9. The reducing gas injection system as claimed in claim 1, wherein a gas flow detector or a thermocouple is mounted within the injector stock, either protruding in the gas flow or being integrated in a refractory lining of said injector stock.

10. The reducing gas injection system as claimed in claim 1, wherein the front portion of the injector is configured to be mounted through an aperture in a cooling plate attached to an inner side of said blast furnace wall.

11. The reducing gas injection system as claimed in claim 10, wherein the front portion of the injector is provided with a cooling system, in fluidic cooling connection with a cooling system of the cooling plate.

12. The reducing gas injection system as claimed in claim 1, wherein an inner surface of the reducing gas distribution pipe, the injector(s), and the injector stock is lined with a refractory insulating material layer.

13. The reducing gas injection system as claimed in claim 1 comprising between 20 and 60 injectors.

14. The reducing gas injection system as claimed in claim 1, wherein the injector(s) is/are oriented perpendicular or tangentially to the blast furnace wall.

15. The reducing gas injection system as claimed in claim 1, wherein the reducing gas distribution pipe is divided in several portions located around the furnace, each portion being supplied by individual reducing gas supply lines.

16. The reducing gas injection system as claimed in claim 1, wherein a protruding cover is arranged above the injector(s) and configured to protect the nozzle body front portion that protrudes inside the furnace from a descending burden material.

17. A blast furnace installation for producing pig iron, comprising a blast furnace and at least one reducing gas injection system as claimed in claim 1, wherein the injector(s) are mounted at shaft level.

\* \* \* \* \*